United States Patent [19]

Okabayashi

[11] Patent Number: 5,408,613
[45] Date of Patent: Apr. 18, 1995

[54] DATA TRANSFER APPARATUS

[75] Inventor: Ichiro Okabayashi, Osaka, Japan

[73] Assignee: Matsushita Electric Industrial Co., Ltd., Osaka, Japan

[21] Appl. No.: 995,873

[22] Filed: Dec. 23, 1992

[30] Foreign Application Priority Data

Dec. 24, 1991 [JP] Japan ................... 3-340618

[51] Int. Cl.$^6$ ............................................. G06F 13/14
[52] U.S. Cl. ................................. 395/275; 395/250; 395/200
[58] Field of Search ............... 395/200, 250, 275, 325, 395/425

[56] References Cited

U.S. PATENT DOCUMENTS

| | | | |
|---|---|---|---|
| 4,667,287 | 5/1987 | Allen et al. | 395/800 |
| 4,769,771 | 9/1988 | Lippmann et al. | 395/200 |
| 5,047,917 | 9/1991 | Athas et al. | 395/325 |
| 5,315,707 | 5/1994 | Seaman et al. | 395/250 |

FOREIGN PATENT DOCUMENTS 63-124162 5/1988 Japan .

OTHER PUBLICATIONS

Dally et al., "Deadlock-Free Message Routing in Multiprocessor Interconnection Networks", IEEE Transaction on Computers, vol. C-36, No. 5, May 1987.

Primary Examiner—David L. Robertson
Attorney, Agent, or Firm—Willian Brinks Hofer Gilson & Lione

[57] ABSTRACT

A parallel processing system enabling a mixed transfer of packets of different lengths is achieved.

The data transfer apparatus in this parallel processing system comprises four address controllers. During the first data transfer the third address controller is used for sending and the first address controller is used for receiving data. During the second transfer, the fourth address controller is used for sending, and the second address controller is used for receiving.

When the first and second transfer operations are mixed, the first and second address controllers are selectively used during receiving, and the third and fourth address controllers are selectively used during sending. Each of the address controllers changes the address only after packet transfer is completed. The header of the packet contains a packet length field, which is interpreted to enable simultaneous, dynamic handling of plural packets of different lengths.

As a result, packets can be transferred without deadlocks occurring even when packets of different lengths are mixed.

8 Claims, 9 Drawing Sheets

DATA TRANSFER APPARATUS

BACKGROUND OF THE INVENTION

1. Field of the Invention

The present invention relates to a means of achieving high functionality and high speed operation in the data transfer component of parallel processing systems, which are widely anticipated in the computer field for high speed processing applications.

2. Description of the Prior Art

Widespread use of large-scale mathematical simulations has significantly increased demand for higher operating speeds in computer processing systems. Parallel processing systems have been developed as one of the most promising future supercomputer technologies, and various systems have been described in the literature.

In a parallel processing architecture, however, data is transferred between processor elements with significantly greater frequency, and the performance and functionality of the data transfer operation significantly affects overall system performance. More specifically, the greatest problems faced in improving the performance of a parallel processing computer are the performance of the individual processors, the software, and the processor-processor data transfer capacity and functionality. This has led to numerous proposals relating specifically to transferring data between processors.

A typical parallel processing system according to the prior art is described below with reference to FIGS. 10 and 11, a block diagram of the conventional parallel processing system and a diagram of the data packet configuration, respectively. It is to be noted that this device has been proposed in Japanese Patent Laid-Open No. S63-124162.

Figure 10:
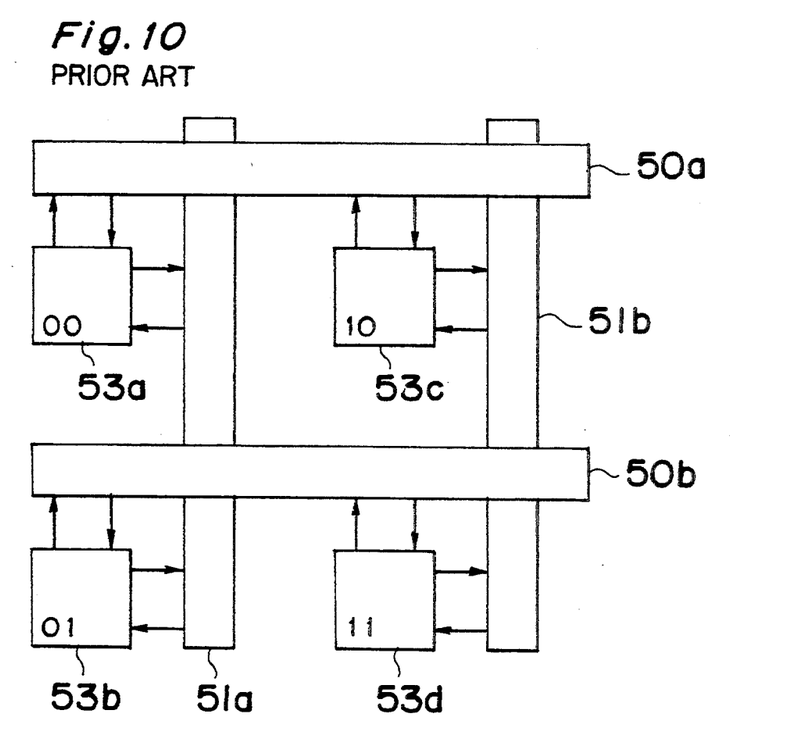
FIG. 10 is a block diagram of a conventional parallel processing system.
Figure 11:
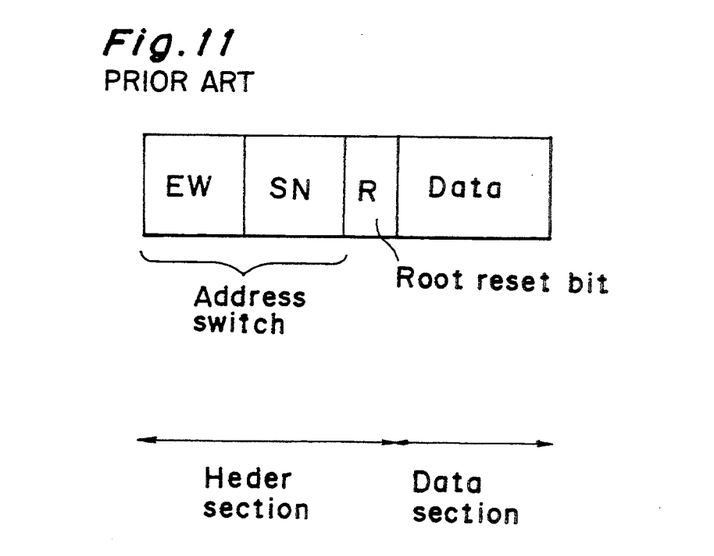
FIG. 11 shows the conventional packet format.

As shown in FIG. 10, this device comprises row crossbar switches 50a and 50b, column crossbar switches 51a and 51b, and element processors 53a–53d. Each element processor 53 comprises input and output ports to row and column crossbar switches 50 and 51. Each data packet (FIG. 11) comprises a header, which contains two switch addresses EW and SN and a routing reset bit R, and a data area.

The operation whereby a packet is transferred from one element processor 53a to another element processor 53d in this conventional parallel processing system is described below.

The packet is transferred in sequence from the element processor 53a to the row crossbar switch 50a, element processor 53c, column crossbar switch 51b, and then to the element processor 53d. The switch addresses EW and SN specify the column and row, respectively, for this operation. In this example both addresses are set to 1. If an error is detected on this route, the routing reset bit R is set to 1, and the packet is resent. If, in this example, an error occurs in the intermediate element processor 53c, the packet is sent the next time from the element processor 53a to the column crossbar switch 51a, element processor 53b, row crossbar switch 50b, and then to the addressed element processor 53d. It is therefore possible to transfer data packets between element processors 53 even if an error occurs in one of the element processors 53 used for routing.

However, the following problems are presented by this configuration.

First, Japanese Patent Laid-Open No. S63-124162 describes only the method of sending data (called "storing") from one element processor to another element processor, and does not describe the process whereby one element processor reads data (called "loading") from another element processor. The loading operation, however, can be more easily handled directly in software, making the loading operation preferable because of the greater flexibility permitted in the software. If both loading and storing operations are supported, however, the memory distributed among each of the processor elements can be freely accessed from any part of the architecture. This results in more flexible software, and a system with higher general utility.

A further drawback is the need to use a single, common packet length throughout the system because there is no packet length information contained in the header. This means that different length packets cannot be handled in this system.

In addition, broadcasting data from one element processor to all other element processors is only possible by addressing the data individually to each of the other element processors.

Finally, this architecture requires data locking measures when a large number of packets is transferred. This is not declared in the application.

SUMMARY OF THE INVENTION

Therefore, an object of the present invention is to provide a data transfer apparatus and parallel processing system which supports data loading, enables packet transmission without data locking occurring when many packets of different lengths are handled, and can enable high speed data broadcasts.

To achieve these objects, a data transfer apparatus according to the present invention comprises a memory port connected to an external memory area; a network port connected to a network; buffers connected between the memory port and the network port for holding the data flowing between the two ports; an interpreter and evaluation means connected to the memory port side of the buffers for interpreting the operating mode encoded in the transfer data; and an address pointer pointing to a specific address and connected to the interpreter and evaluation means.

When data flows from the network port to the memory port, the interpreter and evaluation means decodes the memory port buffer output. When the memory port buffer output is interpreted to be a memory read request and an immediate response is enabled as determined by a buffer not-full state, the interpreter and evaluation means enters the corresponding memory-read sequence to read the data from the memory area specified by the memory read request. When an immediate response is not enabled as determined by a buffer full state, the interpreter and evaluation means writes the memory read request to the memory area indicated by the address pointer so that the interpreter and evaluation means can fetch the memory read request from this same memory area when response becomes possible as determined by a buffer not-full state, interpret the read memory read request, and thus proceed with the corresponding memory-read sequence.

A data transfer apparatus according to an alternative embodiment of the invention comprises a memory port connected to an external memory area; first and second network ports connected to a network of switches; a data selector of which the output is connected to the second network port; a first buffer of which the input is connected to the first network port, and the output is connected to the memory port; a second buffer of which the output is connected to the first input of the data selector, and the input is connected to the first network port; a third buffer of which the output is connected to the second input of the data selector, and the input is connected to the memory port; a first packet interpreter for detecting the packet length included in the data input from the first network port; first and second address controllers for setting the network switch addresses according to the output from the first packet interpreter; a first address selector of which the input is the output from the first and second address controllers, and the output is connected to the first network port; a first control means for controlling the data transfer to the first network port; a second packet interpreter for detecting the packet length included in the data input from the third buffer to determine the packet length; a third address controller for setting the network switch addresses according to the output from the second packet interpreter; a third packet interpreter for detecting the packet length included in the data input from the second buffer to determine the packet length; a fourth address controller for setting the network switch addresses according to the output from the third packet interpreter; a second address selector of which the input is the output from the third and fourth address controllers, and the output is connected to the second network port; and a second control means for controlling the data receiving operation of the second network port.

A parallel processing system according to the invention comprises an N×N matrix of processor elements arranged in a two-dimensional array with a data transfer apparatus described as the alternative embodiment above functioning as the interface to the network, and an N×N×N matrix of switches in a three-dimensional arrangement with each switch comprising two internal buffers.

When in this network the processor element in row i column j is identified as PEij and the number-k switch at row i column j is identified as SWijk where i, j, k, and l are integers greater than zero and less than or equal to (N−1), one network port of PEij is connected in common to one terminal of N switches SWijk (k=0, 1, ... N−1), the other network port of PEij is connected in common to one terminal of N switches SWjli (l=0, 1, ... N−1), the other terminal of SWijk is connected to PEki, and the other terminal of SWjli is connected to PEjl. When plural packets comprising a header and plural data blocks are transferred from PEij to PElk, the packets are transferred from PEij through the first buffer of SWijk to PEki in the first transfer step, and from PEki through the second buffer of SWkil to PElk in the second transfer step.

In data transfer apparatus PEki, the first address controller specifies the addresses of those N switches SWijk (j=0, 1, ... N−1) of which the first buffer is in use, the second address controller specifies the addresses of those N switches SWijk (j=0, 1, ... N−1) of which the second buffer is in use, the third address controller specifies the addresses of those N switches SWkil (l=0, 1, ... N=1) of which the first buffer is in use, and the fourth address controller specifies the addresses of those N switches SWkil (l=0, 1, ... N−1) of which the second buffer is in use. The third address controller of the data transfer apparatus PEki is used when sending data in the first transfer step, and the first address controller is used when receiving data in the first transfer step. The fourth address controller is used when sending data in the second transfer step, and the second address controller is used when receiving data in the second transfer step. When the first and second transfers are mixed, the data transfer apparatus PEki switches between the first and second address controllers when receiving, and switches between the third and fourth address controllers when sending. The address controllers are further characterized by changing the address only at the breaks between packets during the data transfer operation.

In addition, this parallel processing system uses packets comprising a field indicating the transfer mode, a field indicating the switch address in the network, a field indicating a broadcast, which signifies transfer to all switches, and a field indicating the packet length.

Operation

When the data transfer apparatus of the invention as thus described cannot respond immediately to a memory read request because the buffer is full, it buffers the request to the external memory area. When the buffer is not full and the memory read request can be answered, the request is read and interpreted, and the response sequence is entered. As a result, deadlocks caused by a cannot-response state are avoided.

When the first and second transfer sequence packets are mixed because of this configuration, the parallel processing system of the invention operates as follows. In the following description of this network, the processor element in row i column j in the two-dimensional array of N×N processor elements is identified as PEij, and the number-k switch at row i column j in the three dimensional array of N×N×N switches is identified as SWijk where i, j, k, and l are integers greater than zero and less than or equal to (N−1).

Basically, the first address controller specifies the addresses of those N switches SWijk (j=0, 1, ... N−1) of which the first buffer is in use, the second address controller specifies the addresses of those N switches SWijk (j=0, 1, ... N−1) of which the second buffer is in use, the third address controller specifies the addresses of those N switches SWkil (l=0, 1, ... N−1) of which the first buffer is in use, and the fourth address controller specifies the addresses of those N switches SWkil (l=0, 1, ... N−1) of which the second buffer is in use.

During the first transfer step, the first address controller is used when receiving data, and the third address controller is used when sending data.

During the second transfer step, the second address controller is used when receiving data, and the fourth address controller is used when sending data.

When the first and second transfers are mixed, the data transfer apparatus switches between the first and second address controllers when receiving, and switches between the third and fourth address controllers when sending. Each of the address controllers changes the memory address at the end of each packet being sent.

In addition, the header of the packets used in the invention comprise a field specifying the packet length and whether the packet is to be broadcast, i.e., sent to all other processor elements. By interpreting this header data, plural packets of varying lengths can be handled dynamically in realtime, and packet broadcasting can be completed much more quickly. As a result, data transfer is possible even when packets of varying lengths are combined in the transfer operation.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of the data transfer apparatus and parallel processing system according to the present invention are described hereinbelow with reference to the accompanying figures.

First Embodiment

This first embodiment is described below during execution of the load operation, i.e., when one processor element reads data from another processor element.

Figure 1:
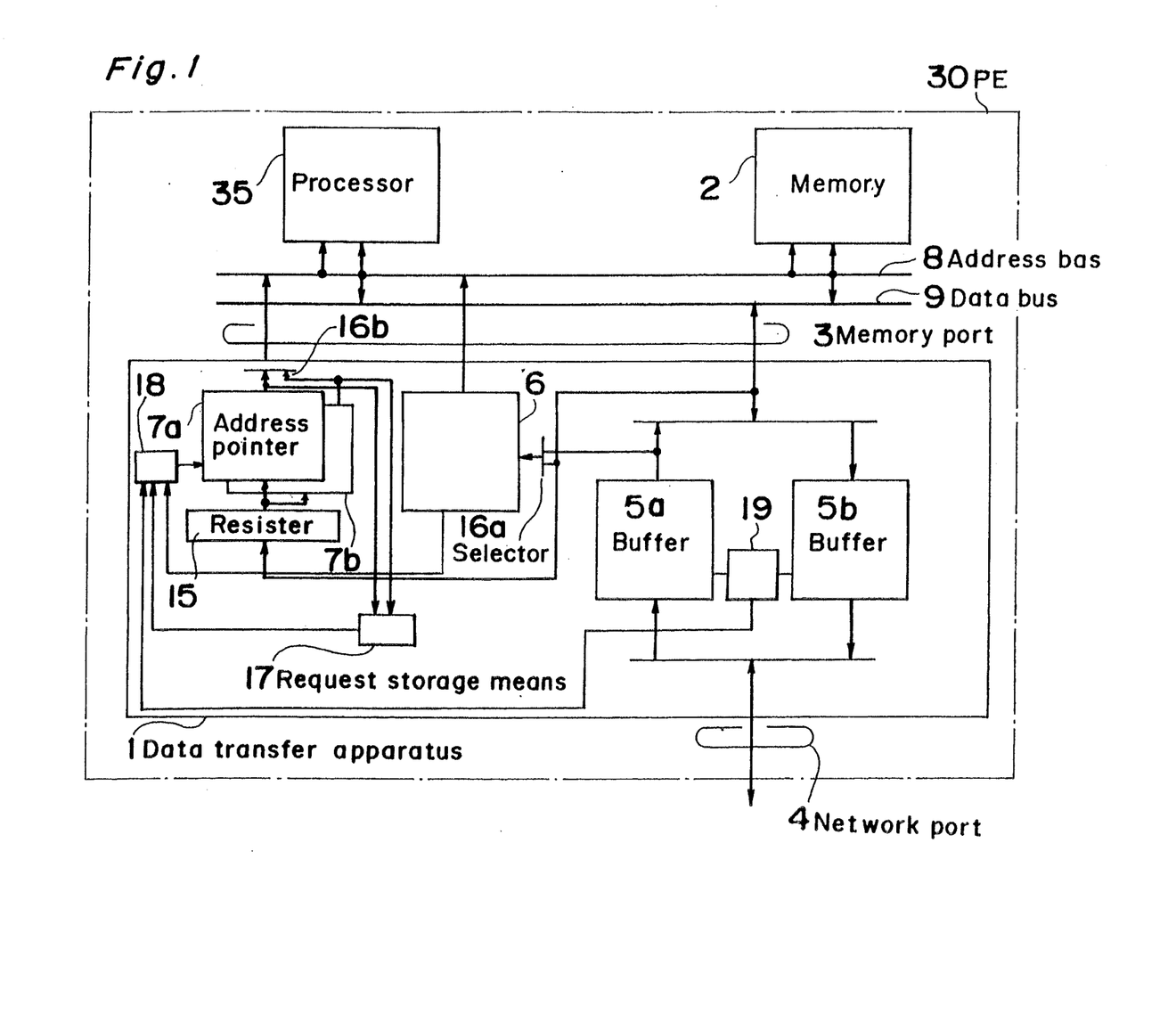
FIG. 1 is a block diagram of the data transfer apparatus according to the first embodiment of the invention, and the processor element with peripheral connections.
Figure 2A:
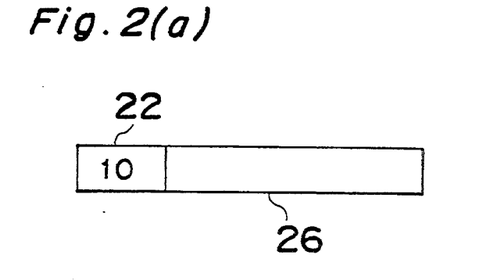
FIGS. 2(a) and 2(b) show the data format of the packet in a memory read request-and the memory read response of this embodiment.
Figure 2B:
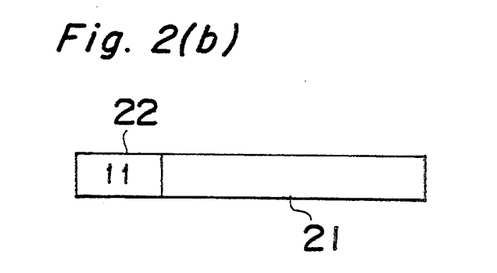
Figure 3:
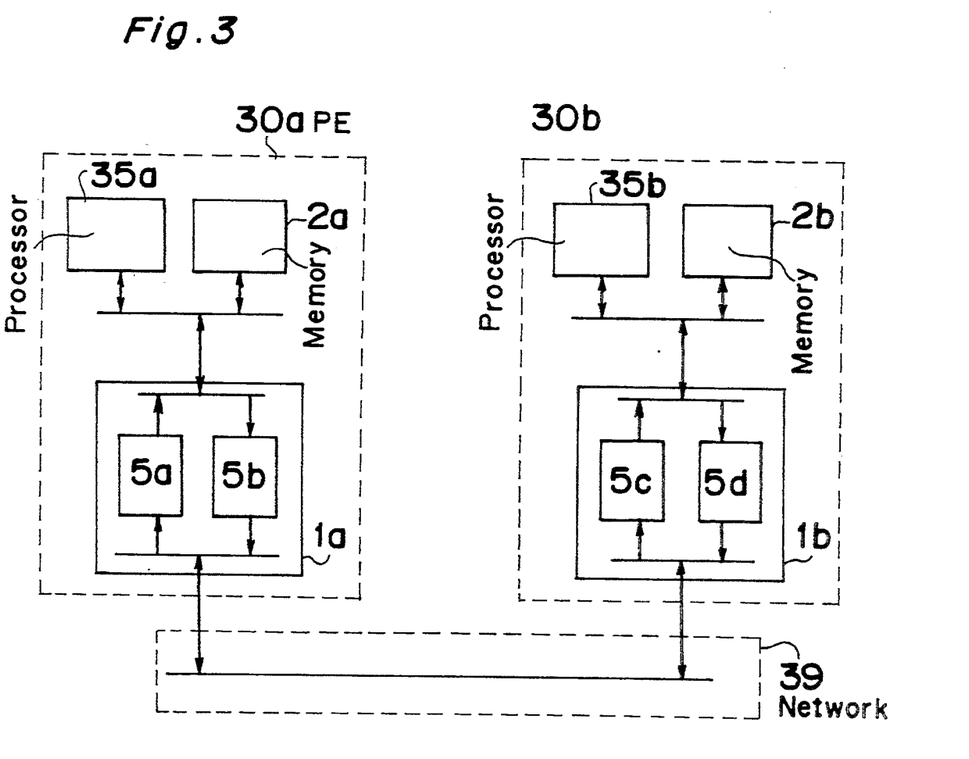
FIG. 3 is a block diagram of a parallel processing system using the data transfer apparatus of the first embodiment.

FIG. 1 is a block diagram of the data transfer apparatus according to the first embodiment of the invention, and the processor element with peripheral connections. FIG. 2(a) shows the data format of the packet in a memory read request of this embodiment, and FIG. 2(b) shows the data format of the packet of the memory read response. FIG. 3 is a block diagram of a parallel processing system using the data transfer apparatus of the first embodiment.

The data transfer apparatuses 1, 1a, and 1b shown in these figures are connected to an external memory area 2, 2a, and 2b through the memory ports 3, and through the network ports 4 to the network 39. Buffers 5a, 5b, 5c, and 5d connected between the memory port 3 and network port 4 hold the data flowing between the memory and network ports, and the interpreter and evaluation means 6 is connected to the memory port side of the buffer 5. The value of the address pointers 7a, 7b to the memory area is set according to the variable contents of the register 15. An address bus 8, data bus 9, and selectors 16a, 16b are also provided. The request storage means 17 counts the number of requests based on the difference between the two address pointers 7a and 7b. Reference numbers 18 and 19 denote address pointer control means and buffer control means, respectively. The data packets comprise a data area 21, operating mode 22, and memory address area 26. Each processor element (PE) 30, 30a, and 30b comprises a data transfer apparatus 1, external memory 2, and processor 35, 35a, 35b, and the buses and ports required for the connections between them.

As shown in FIG. 3, each PE 30a, 30b is connected to the network 39. The network shown here uses the simplest bus connection with only two processor elements shown. As shown in FIG. 1, each processor element has the processor 35, external memory 2, and data transfer apparatus 1 connected commonly to a bus.

Referring to FIGS. 2(a) and 2(b), the possible operating modes written in the operating mode 22 of the packet include:
- 00: write to another processor,
- 10: read from another processor (request),
- 11: read from another processor (reply).

The operation of the data transfer apparatus described above when the one PE 30b reads from the memory assigned to the other PE 30a is described below with reference to FIGS. 1, 2(a) and 2(b) and 3. This is the "load" function discussed above in the description of the prior art. In this operation, the read request is output from PE 30b to PE 30a, and the response then flows from PE 30a back to PE 30b. For simplicity, the following description focuses on the operation of PE 30a, and the apparatus shown in FIG. 1 is assumed to be specifically PE 30a.

The external memory 2 read request is input from the PE 30b through the network port 4. The request is stored in the buffer 5a, and input by the selector 16a to the interpreter and evaluation means 6 by which the request is decoded. At this time the operating mode area 22 shown in FIG. 2a is decoded as '10,' and thus determined to be a memory read request.

If the request can be immediately replied to (because the buffer is not full), the data is read from the external memory 2 and transferred through the buffer 5b to the network port 4. The packet sent at this time is as shown in FIG. 2(b), i.e., the data area 21 is now contained in the packet. The memory read address is contained in the read request data (the memory address area 26) as shown in FIG. 2(a), and the interpreter and evaluation means 6 outputs this address over the address bus 8. The data is transferred over the data bus 9. The case that the request can be immediately replied to is a case that the buffer 5b is not full. This is decided by the buffer control means 19.

It is also possible that the request cannot be immediately complied with. This occurs when the buffer 5b is full and, therefore, the data cannot be stored when read from memory. When this occurs, the request is temporarily stored in the external memory 2, and a flag indicating that the request is stored in external memory 2 is simultaneously set in the request storage means 17.

The address of this external memory 2 is generated by the address pointer 7a under control of the address pointer control means 18 and output from the selector 16b to the address bus 8. It is possible to use a constant value as the initialization value of this address, but in this embodiment the initialization value is externally set in the register 15 through the data bus 9.

It is important to note that the data transfer apparatus can be used to perform another operation until it is possible to respond to the read request because the request-stored flag is held in the request storage means 17. For example, it is possible, after receiving this read request, to receive data through the network port 4 and write this data to the external memory 2 through the buffer 5a. When it becomes possible to respond to the previous read request, i.e., when the buffer 5b full state is cleared, the data transfer apparatus 1 outputs the address pointer 7b through the selector 16b to the address bus 8, reads the stored request from the external memory 2, and simultaneously clears the request-stored flag in the request storage means 17. The address pointer 7b generates an address under control of the address pointer control means 18 which receives outputs from the request storage means 17 and the buffer control means 19 and outputs the same through the selector 16b. The stored request is then input to the interpreter and evaluation means 6 through the selector 16a, and interpreted. Thereafter, operation proceeds as when it is initially possible to respond immediately to the read request: the data is read from the external memory 2 and output through the buffer 5b to the network port 4.

The address pointers 7a, 7b and the request storage means 17 are described in greater detail below. Note that these can function effectively in response to plural requests.

The first step is to set the initialization values in the register 15. One address pointer 7a is used when writing to the external memory 2, and another address pointer 7b is used when reading. In both cases, the address pointer value is advanced by the address pointer control means 18 after the operation is completed. As a result, one address pointer 7a can be used as a write pointer, and the other address pointer 7b as a read pointer, the external memory 2 is operated as a first-in, first-out (FIFO) data storage area, and plural requests can be buffered. The size of the buffer area is also set in the register 15. Once the address pointer values are advanced to the end of the buffer area, they are reset to the initialization value at the next pointer assignment. It is also possible with a FIFO device to calculate the amount of data stored in the device by obtaining the difference between the write and read pointers. As a result, the number of read requests stored to the external memory 2 can be determined by using the request storage means 17 to detect the difference between the two address pointers 7a and 7b.

Deadlocks are described below with reference to FIG. 3.

A deadlock would normally occur when both PE 30a and PE 30b are sending data to the other processor element, all buffers 5a, 5b, 5c, and 5c are full, and both PE 30a and PE 30b are simultaneously attempting to read the memory of the other processor element, i.e., the first output from both buffer 5a and buffer 5c is a memory read request. In this state it is not possible to respond because both buffer 5b and buffer 5d are full. In addition, buffer 5b and buffer 5d cannot send data to buffer 5a and buffer 5c because they are full. All buffers therefore remain full, and the system assumes a deadlocked state because all of the buffers are full and the full state cannot be cleared.

The control sequence of the present invention as described above functions effectively at this time to prevent a deadlock by temporarily storing the read request to the external memory 2. As a result, buffer 5a and buffer 5c sequentially output the buffered data to the external memory 2, and the deadlock does not occur. The memory read operation can be executed by dynamically monitoring the buffer states, specifically by waiting until the buffer 5b, 5d is not full. Because the control sequence is the key to this operation, minimal hardware is required, making it an extremely effective means of avoiding deadlock states.

As described hereinabove, a data transfer apparatus according to the present invention makes it possible to read data from the memory of another processor element. The software is also extremely flexible, and a system with wide general applicability can be achieved in a parallel processing system configured with this data transfer apparatus because the memory assigned to each processor element can be dynamically accessed from anywhere in the system.

It is to be noted that the number of processor elements and the network configuration of the present embodiment are not limited to those as described above.

Second Embodiment

Figure 4:
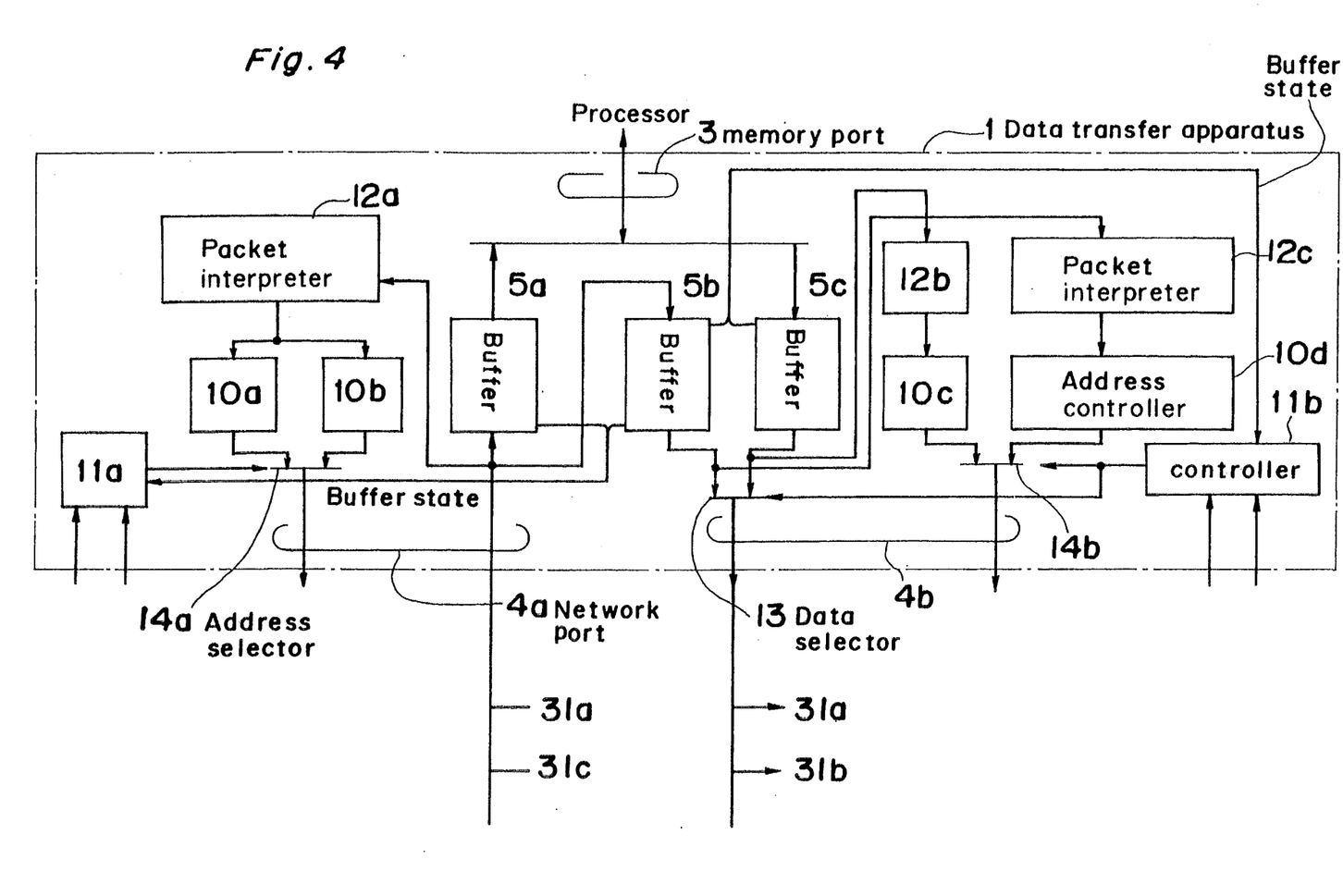
FIG. 4 is a block diagram of the data transfer apparatus according to the second embodiment of the invention.
Figure 5:
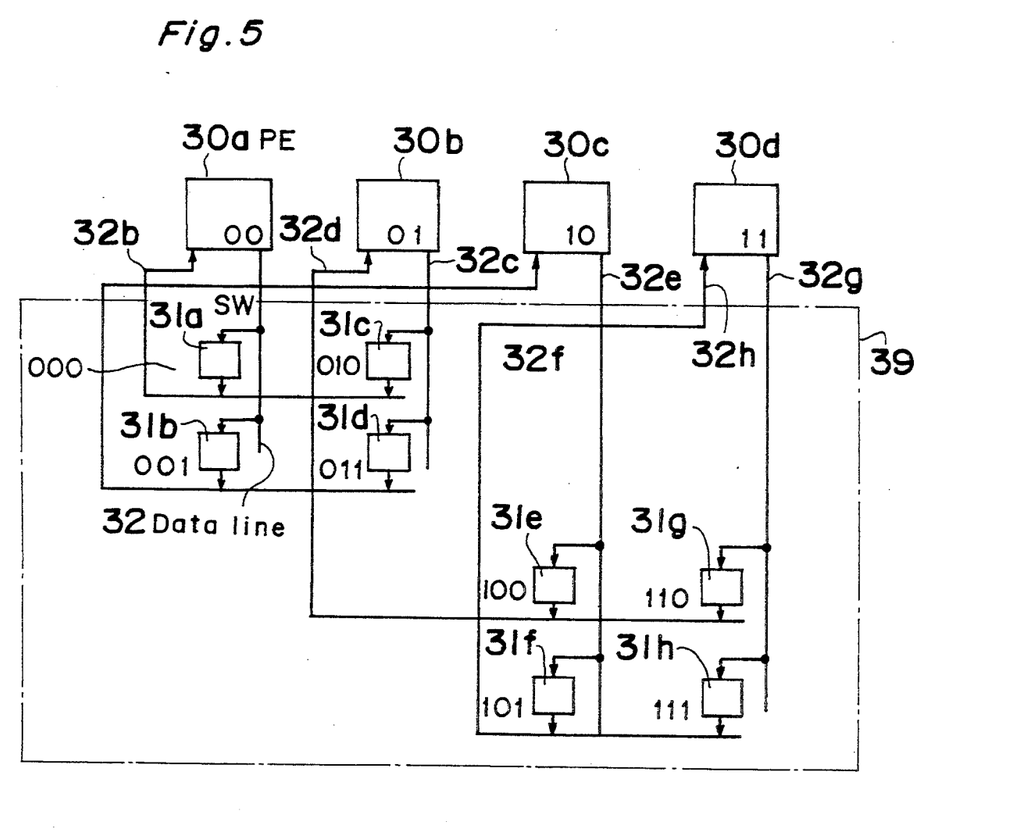
FIG. 5 is a block diagram of a parallel processing system using the data transfer apparatus according to the second embodiment of the invention.
Figure 6:
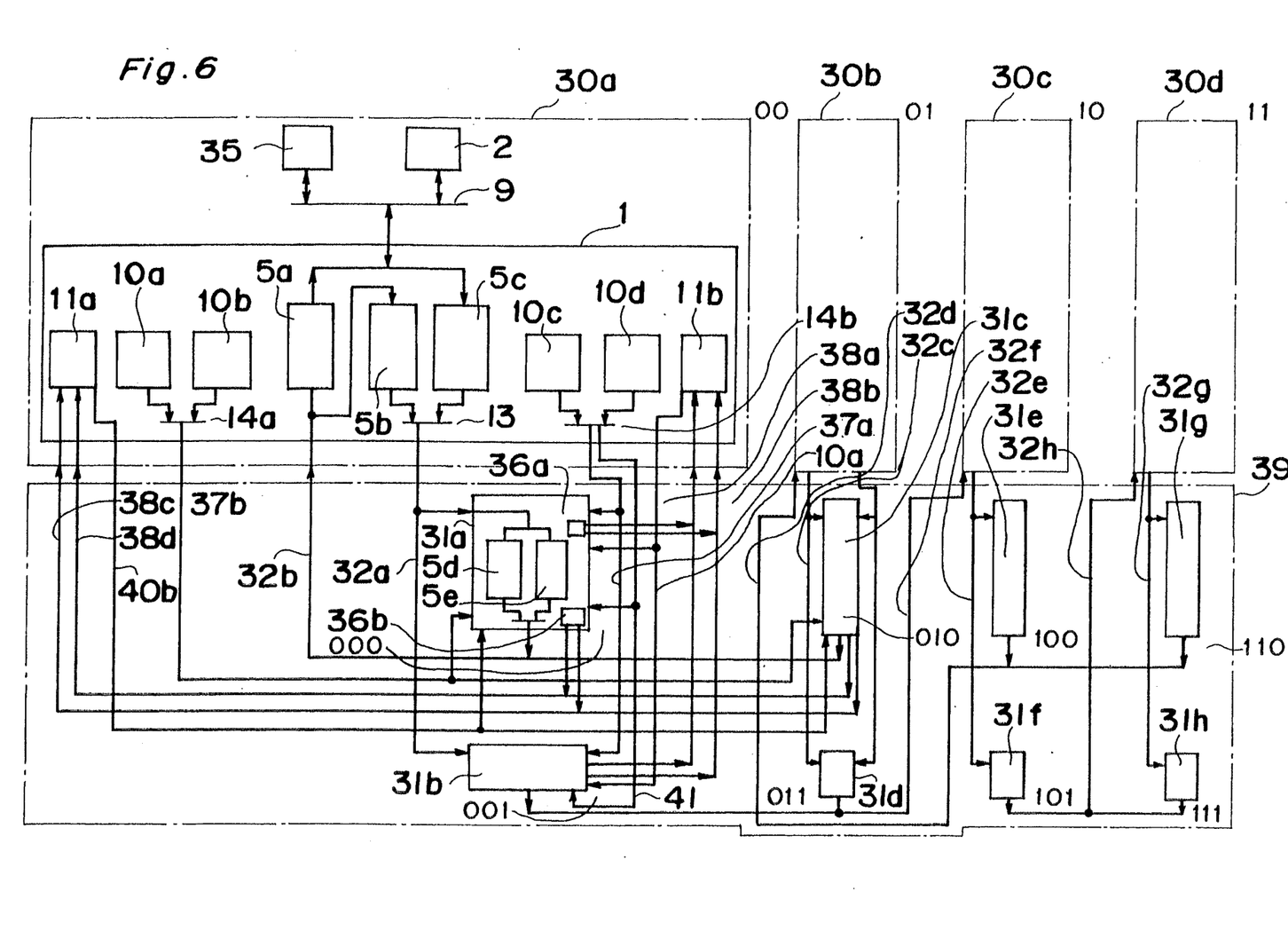
FIG. 6 is a more detailed illustration of the connections used in the parallel processing system shown in FIG. 5.

The second embodiment of the invention is described when sending packets between any desired processor elements. FIG. 4 is a block diagram of a data transfer apparatus according to the second embodiment, and FIG. 5 is a block diagram of the parallel processing system using the data transfer apparatus shown in FIG. 4. FIG. 6 is a more detailed illustration of the connections used in the parallel processing system shown in FIG. 5. The connections between the processor elements and switches are the same throughout the system.

In FIG. 5 the processor elements are shown as 30a–30d, the switches (SW) as 31a–31h, and the data buses as 32a–32h.

In FIG. 6, the data bus is shown as 9, the processor as 35, the state evaluation means for judging full or empty of buffers provided in respective switches as 36a and 36b, the state buses as 38a–38d, the address buses as 37a and 37b, the network as 39, the buffer selection signal as 40, and the broadcast signal as 41. It is to be noted that this network 39 is described in detail in the Parallel Computer in U.S. Pat. No. 4,514,807. This network 39 is described briefly below because it is essential to the description of FIG. 6, but the description in U.S. Pat. No. 4,514,807 should be referenced for greater detail.

The configuration and operation of the data transfer apparatus are first described with reference to FIG. 4.

The data transfer apparatus is connected to the external memory area through the memory port 3, and through the first and second network ports 4a, 4b to the network 39. There are three buffers 5a, 5b, and 5c. The first buffer 5a input is connected to the network port 4a, and the output to the memory port 3. The second buffer 5b output is connected to the first input of the data selector 13, and the input to the network port 4a. The third buffer 5c output is connected to the second input of the data selector 13, and the input to the memory port 3.

There are four address controllers 10a, 10b, 10c, and 10d. The first and second address controllers 10a and 10b set the network switch addresses according to the output from the first packet interpreter 12a. The third address controller 10c sets the network switch addresses according to the output from the second packet interpreter 12b. The fourth address controller 10d sets the network switch addresses according to the output from the third packet interpreter 12c.

The first control means 11a controls the transfer of data to the first network port 4a, and the second control means 11b controls the transfer of data to the second network port 4b.

The first packet interpreter 12a detects the packet length included in the data input from the first network port 4a. The second packet interpreter 12b detects the packet length included in the data input from the third buffer 5c to determine the packet length. The third packet interpreter 12c detects the packet length included in the data input from the second buffer 5b to determine the packet length.

The data selector 13 inputs are from the second buffer 5b and third buffer 5c. The first address selector 14a inputs are received from the first and second address controllers 10a, 10b, and the output is connected to the first network port 4a. The second address selector 14b inputs are received from the third and fourth address controllers 10c, 10d, and the output is connected to the second network port 4b.

Figure 7:
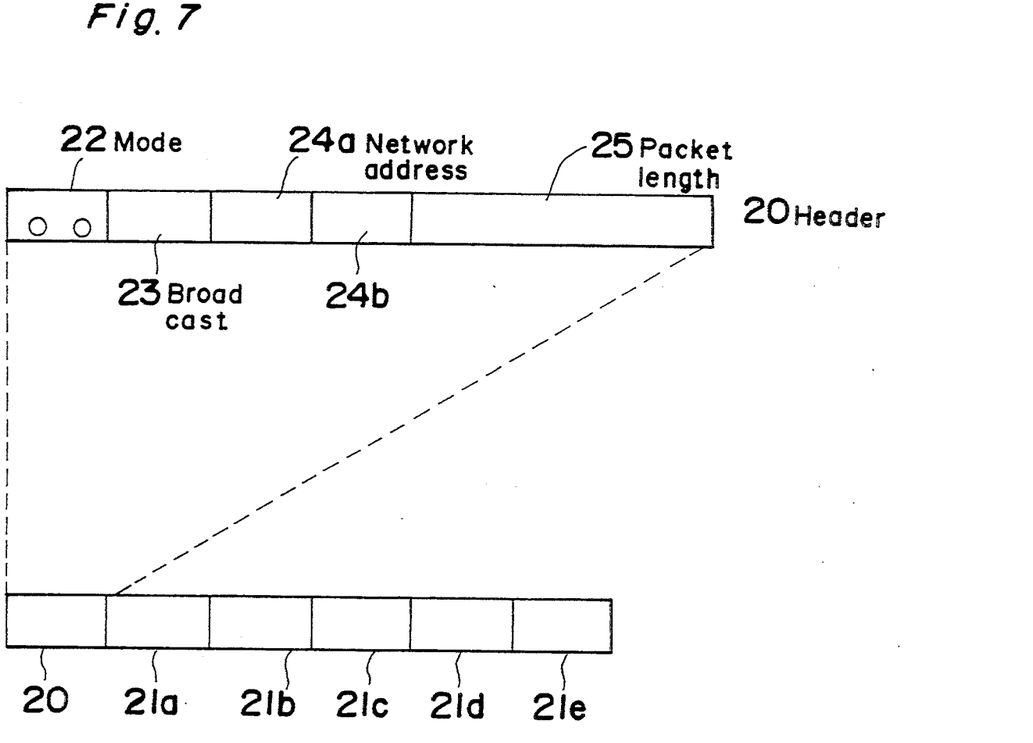
FIG. 7 shows the data format of the packet used in this parallel processing system.

The configuration of the packets used in this parallel processing system is shown in FIG. 7. Each packet comprises a header 20 and one or more data words 21a–21e. The header 20 comprises an operating mode area 22, which is the field indicating the transfer mode, a broadcast field 23 used to indicate that the packet is to be sent to all switches (i.e., to be broadcast), network address fields 24a and 24b containing the switch address in the network, and packet length 25 information. The length of the data area 21 in the packet shown in FIG. 7 is five words 21a–21e, and this information is contained in the packet length 25. The operating mode area 22 in FIG. 7 is configured as shown in FIG. 2.

In the following description of processor element operation according to this embodiment, the operating mode 22 value is set to '00' to cause a send-relay-receive operation.

Referring to FIG. 4, the data flows in three directions: (1) from network port 4a to first buffer 5a and memory port 3, (2) from network port 4a to second buffer 5b and network port 4b, and (3) from memory port 3 to third buffer 5c and network port 4b. Referring to the parallel processing system in FIG. 5, flow (1) corresponds to data receiving, flow (2) to data relay, and flow (3) to data sending.

There are two sets of address controllers 10, control means 11, and packet interpreters 12, one for sending and one for receiving data. During receiving, data input from the one network port 4a is interpreted by the first packet interpreter 12a and the packet length is set in the address controllers 10a and 10b. The first address controller 10a sets the SW buffer 5d address during a data relay operation, and the second address controller 10b sets the SW buffer 5e address during a data receive operation. The first control means 11a switches the first address selector 14a to control whether data is written to the first buffer 5a or the second buffer 5b.

When sending data, the output from the second buffer 5b is interpreted by the third packet interpreter 12c to set the packet length in the fourth address controller 10d. The output from the third buffer 5c is interpreted by the second packet interpreter 12b to set the packet length in the third address controller 10c. The second control means 11b switches between the data selector 13 and the second address selector 14b.

The method of connecting the processor elements is described below with reference to FIGS. 5 and 6.

The following naming convention is used to identify PE 30a–30d and SW 31a–31h below. Specifically, PE 30a, 30b, 30c, and 30d are identified as PE00, PE01, PE10, and PE11, and SW 31a, 31b, 31c, 31d, 31e, 31f, 31g, and 31h as SW000, SW001, SW010, S1011, SW100, SW101, SW110, and SW111, respectively. One PE is connected to another PE through a SW where the relationship of the connections is defined as PEij→Swijk→PEki. For example, PE10 is connected to PE01 through SW100 (PE10→SW100→PE01), and to PE11 through SW101 (PE10→SW101→PE11). It follows that communication between any two processor elements can be achieved through the route PEij→SWijk→PEki→SWkil→PElk.

The transfer operation is described in detail below with reference to FIG. 6.

The first transfer operation is to read from the external memory 2 of the PE and write the data to the relay buffer 5b of the PE over the network 39. The second transfer operation is to read from the relay buffer 5b of the PE and write the data to the external memory 2 of the PE over the network 39.

The send-receive-relay data flow mentioned earlier is described first. The address controller used is shown in parentheses () after the switch.

SEND: external memory 2→third buffer 5c of the data transfer apparatus 1→buffer 5d of SW 31a (third address controller 10c)

RELAY: buffer 5d of SW 31a (first address controller 10a)→buffer 5b of the data transfer apparatus 1→buffer 5e of SW 31a (fourth address controller 10d)

RECEIVE: buffer 5e of SW 31a (second address controller 10b)→buffer 5a of the data transfer apparatus 1→external memory 2.

Using the above convention, communication between any given processor elements flows as follows: (PEij, external memory 2→third buffer 5c)→SWijk, buffer 5d)→(PEki, buffer 5b)→(SWkil, buffer 5e)→(PElk, buffer 5a→external memory 2). In other words, the switches are used to select one buffer 5d for the first data transfer operation, and to select another buffer 5e for the second data transfer operation. In addition, the data transfer apparatus 1 uses the first address controller 10a and third address controller 10c to select the switches for the first data transfer operation, and the second address controller 10b and fourth address controller 10d to select the switches for the second data transfer operation.

The signal buses are described next. The state buses indicate whether data can be transferred, or more specifically the state of the buffers 5d and 5e.

In a buffer full state, data cannot be sent from the PE to the SW, but can when the buffer is not full. In a buffer empty state, data cannot be sent from the SW to the PE, but can if the buffer is not empty. These states are detected by the state evaluation means 36a and 36b. State bus 38a (for PE→SW) and state bus 38c (for SW→PE) correspond to buffer 5d, and state bus 38b (for PE→SW) and state bus 38d (for SW→PE) correspond to buffer 5e. It is to be noted that the SW selected by the address bus outputs, and the other switches are in a high impedance state. An open drain system can also be used.

If buffer selection signal 40a and 40b are 0, buffer 5d is selected; if 1, buffer 5e is selected.

The address buses 37a, 37b determine which switch is selected. For example, if address bus 37a is 0, data is obtained from SW 31a; if 1, SW 31b.

The operation of each part is followed starting with the send operation below and focusing on PE 30a and SW 31a. FIG. 4 is used when referring to the data transfer apparatus 1.

(1) TRANSMISSION

The data transfer apparatus 1 reads from the external memory 2 and stores the data in the third buffer 5c. The data transfer apparatus 1 even stores to the third buffer 5c when the processor 35 sends data to the data transfer apparatus 1. The data output from the third buffer 5c is then interpreted by the second packet interpreter 12b to set the SW address in the third address controller 10c; this set address is the network address 24a. The operating mode 22 value in this packet is '00.' The relay and receive PEs therefore function accordingly.

Next, the address controller 10c outputs the address of SW to the address bus 37a and checks the buffer state of the destination. Namely, the second control means 11b then reads the state bus. If the state bus 38a indicates a data transfer is enabled, the second control means 11b sets buffer selection signal 40a to 0, and the address controller 10c continues to output the address of SW to the address bus 37a, outputs the third buffer 5c data to the data bus 32a, and thus transfers the data to the corresponding buffer of the corresponding switch. In this example, a 0 is output to address bus 37a and written to the buffer 5d of SW 31a. The packet length is decoded by the second packet interpreter 12b, and the third address controller 10c does not advance the address until the one packet is completely sent.

(2) RELAY

The buffer state of each SW is always checked by scanning the switches at the input side of the data transfer apparatus 1. Since two switches are connected thereto, 0 and 1 are output to the address bus 37b, alternatively. The first control means 11a reads the state bus, and if the state bus 38c indicates a data transfer is enabled, the first control means 11a stops scanning and begins reading operation. Namely, it sets buffer selection signal 40b to 0, and, by sending the address of SW to the address bus 37b by the address controller 10a, reads the corresponding buffer of the corresponding switch, and fetches the data to buffer 5b. In this example, a 0 is output to address bus 37b and buffer 5d of SW 31a is read.

The data output from the buffer 5d is then interpreted by the third packet interpreter 12c to set the switch address in the fourth address controller 10d. As above, this is the network address 24b. The operating mode 22 value in this packet is '00.'

Next, the buffer state of the destination is checked by outputting the address of SW to the address bus 37a from the address controller 10d. Namely, the second control means 11b reads the state bus, and if the state bus 38b indicates a data transfer is enabled, sets buffer selection signal 40a to 1, and, by continuing output of the address to the address bus 37a from the address controller 10d, output the second buffer 5b data to the data bus 32a, and thus transfers the data to the corresponding buffer of the corresponding switch. In this example, a 0 is output to address bus 37a and written to the buffer 5e of SW 31a.

At the one network port 4a side, the packet length is decoded by the first packet interpreter 12a, and the first address controller 10a does not advance the address until the one packet is completely transferred. At the other network port 4b side, the packet length is decoded by the third packet interpreter 12c, and the fourth address controller 10d does not advance the address until the one packet is completely sent.

(3) RECEIVING

Similarly to the RELAY mode, the buffer state of each SW is always checked by scanning the switches at the input side of the data transfer apparatus 1. Since two switches are connected thereto, 0 and 1 are output to the address bus 37b, alternatively. The first control means 11a reads the state bus, and if the state bus 38d indicates a data transfer is enabled, sets buffer selection signal 40b to 1, and, by outputting the address of SW at that time to the address line 37b from the address controller 10b, reads the corresponding buffer of the corresponding switch into the first buffer 5a. In this example, a 0 is output to address bus 37b and buffer 5e of SW 31a is read.

The data transfer apparatus 1 then writes the first buffer 5a data to the external memory 2, or the processor 35 reads the first buffer 5a.

The packet length is decoded by the first packet interpreter 12a, and the second address controller 10b does not advance the address until the one packet is completely transferred. In other words, the first packet interpreter 12a controls the selection and operation of the address controllers 10a and 10b according to the first and second transfer operations (corresponding to relay and receive operations).

By applying this control method, mixed send, relay, and receive operations are handled as follows.

Each of the address controllers changes the address only at the end of any packet currently being transferred. The two buffers 5d and 5e of the switches are also used selectively. Which buffer is used can be controlled as follows by focusing on the buffer state. For simplicity, each buffer is referenced as simply 5n, e.g., buffer 5b as "5b." The following abbreviations are also used: e=empty, f=full, send (1)=first write (5c→5d), send (2)=second write (5b→5e), recv (1)=first read (5d→5b), and recv (2)=second read (5e→5a).

Figure 8:
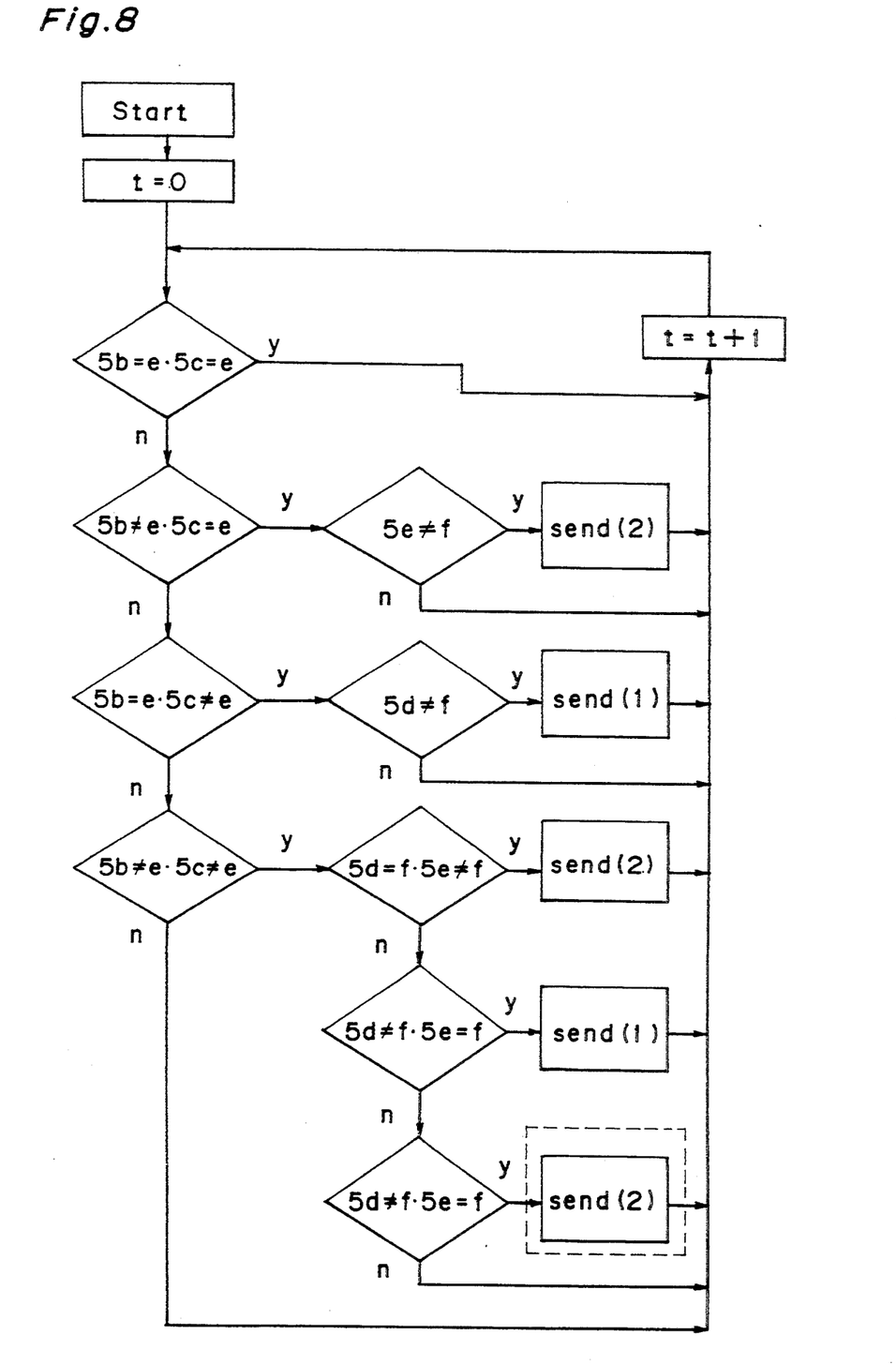
FIG. 8 is a flow chart of the sending algorithm used in this parallel processing system.
Figure 9:
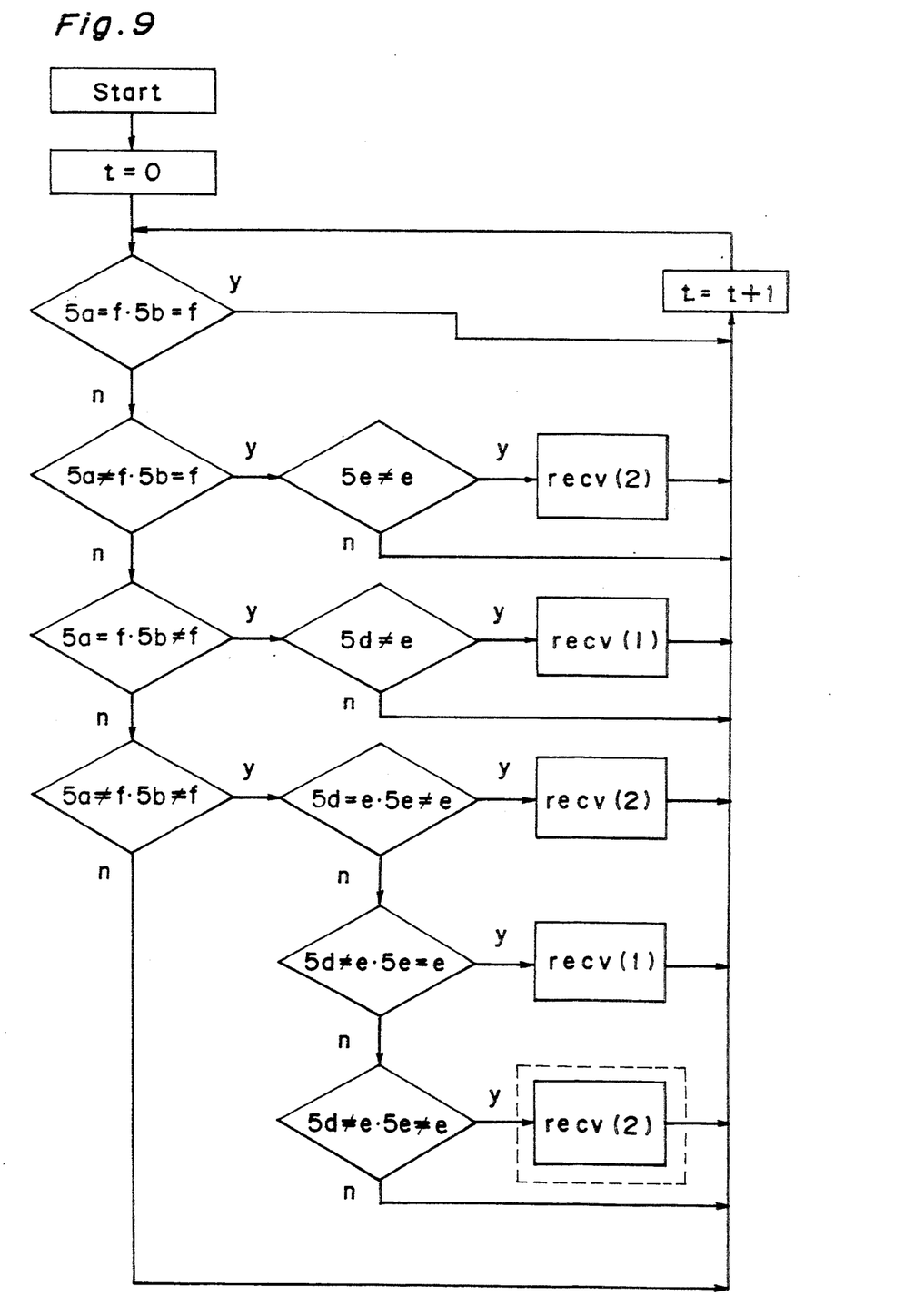
FIG. 9 is a flow chart of the receiving algorithm used in this parallel processing system.

FIG. 8 and FIG. 9 show the operating algorithm for the send and receive operations, respectively. This algorithm is also shown below with an expression similar to C. Note that in the following expression nop indicates that send and recv operations are not executed and there is a time advance only.

1) At network port 4b
```
if (5b=e) & (5c=e) nop;
else if (5b<>e) & (5c=e) {
    if (5e<>f)   send(2);
    else         nop;
}
else if (5b=e) & (5c<>e) {
    if (5d<>f)   send(1);
    else         nop;
}
else if (5b<>e) & (5c<>e) {
    if (5d=f) & (5e<>f)     send(2);
    if (5d<>f) & (5e=f)     send(1);
    if (5d<>f?) & (5e<>f)   send(2);
    if (5d=f) & (5e=f)      nop;
}
```

The first step is to check the buffers in the data transfer apparatus 1. If there is data to be sent (the buffer is not empty), check the buffers in the switch; if the switch can receive (the buffer to which the data transfer apparatus wants to send data is not full), begin sending.

If both of the buffers in the data transfer apparatus 1 are not empty, or both of the two buffers in the switch are not full, either can be sent. In this case, the second send (5b→5e) as indicated by the dotted line in FIG. 8 is executed.

```
2)  At network port 4a
    if (5a=f) & (5b=f) nop;
    else if (5a<>f) & (5b=f) {
      if (5e<>e)  recv(2);
      else        nop;
    }
    else if (5a=f) & (5b<>f) {
      if (5d<>e)  recv(1);
      else        nop;
    }
    else if (5a<>f) & (5b<>f) {
      if (5d=e) & (5e<>e)    recv(2);
      if (5d<>e) & (5e=e)    recv(1);
      if (5d<>e) & (5e<>e)   recv(2);
      if (5d=e) & (5e=e)     nop;
    }
```

The first step is to check the buffers in the data transfer apparatus 1. If data can be received (the buffer is not full), check the buffers in the switch; if data is stored in the switch buffer (the buffer to be read by the data transfer apparatus is not empty), begin receiving.

If both of the buffers in the data transfer apparatus 1 are not full, or both of the two buffers in the switch are not empty, either can be read. In this case, the second read (5e→5a) as indicated by the dotted line in FIG. 9 is executed.

Because it is always possible to read the buffer 5e as described above, the packets on the network 39 are sequentially dumped to the external memory 2, and a deadlock state does not occur.

It is to be noted that the second transfer operation as indicated by the dotted lines in FIGS. 8 and 9 is given priority, but the algorithm can be easily modified to give priority to the first transfer operation.

A broadcast transfer whereby data is sent from one PE to all other processor elements is described next. To do this, the broadcast field 23 in the packet header 20 is set to 1. When the data transfer apparatus 1 interprets this, it outputs a broadcast signal 41 from the network port 4b when sending. This causes the switches to ignore the address bus 37a so that all switches connected to the same data bus (SW 31a and SW 31b, for data bus 32a) fetch the data at the same time. Because the switches operate in parallel, performance is improved. The same is true whether buffer 5b or 5c is the source.

As described above, data transfers between any given processor elements is possible without a deadlock occurring even when the transfer contains packets of different lengths, and broadcast transfers are also executed at high speed. In addition, because transfer relays are supported in hardware, there is minimal relay overhead, and high transfer performance is achieved.

It is to be noted that while the direction of data flow is one-way in the parallel processing system described in the present embodiment, the same results can be achieved in two-way transfers.

As described hereinabove, a data transfer apparatus according to the present invention can read data from the memory of another processor element. When it is not possible to respond immediately to a memory read request, the request is buffered to external memory so that it can be quickly fetched, interpreted, and the corresponding response sequence executed when response becomes possible. Deadlocks caused by an inability to respond to a request are therefore avoided by this control process.

In addition, the parallel processing system of the invention comprises four address controllers, and uses the third address controller for sending and the first address controller for receiving during the first data transfer operation, and uses the fourth address controller for sending and the second address controller for receiving during the second data transfer operation.

When the first and second data transfer operations are mixed, the first and second address controllers are selectively used during receiving, and the third and fourth address controllers are selectively used during sending. Furthermore, the address controllers only change the address at breaks between packets.

By including fields for the packet length and broadcasting in the packet header, plural packets of different lengths can be dynamically handled, and high speed packet broadcasting can be achieved by interpreting the information in these fields.

As a result, data transfer can be maintained even when the packets are of different lengths, and high performance can be achieved because this is supported by the hardware. The practical effectiveness of the invention is therefore great considering the growing importance of parallel processing systems and the effect of high speed packet transfers on overall system performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data transfer apparatus comprising a memory port connected to an external memory area,
  a network port connected to a network,
  buffers connected between the memory port and the network port for holding the data flowing between the two ports,
  an interpreter and evaluation means connected to the memory port side of the buffers for interpreting the operating mode encoded in the transfer data, and
  an address pointer pointing to a specific address and connected to the interpreter and evaluation means such that
  when data flows from the network port to the memory port, the interpreter and evaluation means decodes the memory port buffer output;
  when the memory port buffer output is interpreted to be a memory read request and an immediate response is enabled as determined by a buffer not-full state, the interpreter and evaluation means enters the corresponding memory-read sequence to read the data from the memory area specified by the memory read request;
  when an immediate response is not enabled as determined by a buffer full state, the interpreter and evaluation means writes the memory read request to the memory area indicated by the address pointer so that the interpreter and evaluation means can fetch the memory read request from this same memory area when response becomes possible as determined by a buffer not-full state, interpret the read memory read request, and thus proceed with the corresponding memory-read sequence.

2. A data transfer apparatus according to claim 1 wherein the external memory area is used as a first-in, first-out (FIFO) device by means of write address pointers and read address pointers whereby the request is written to the address indicated by the write address pointer and the write address pointer is then advanced when there is a write request, and the request is read from the address indicated by the read request pointer and the read address pointer is then advanced when there is a read request.

3. A data transfer apparatus according to claim 2 further comprising an externally programmable register for storing the initialization values of the two address pointer sets, and information defining the allowable range of address pointer change, and the address pointers are reset to the initialization values after being advanced to the range limit.

4. A data transfer apparatus according to claim 1, 2, or 3 wherein the data format comprises a field for identifying the transfer mode, and a field for identifying the memory address.

5. A parallel processing system comprising plural processor elements each having a data transfer apparatus according to claim 1, 2, 3, or 4 as the interface to the network, and a network connecting the processor elements to enable data transfer there between.

6. A data packet transfer apparatus comprising a memory port connected to an external memory area, first and second network ports connected to a network, a data selector of which the output is connected to the second network port, a first buffer of which the input is connected to the first network port, and the output is connected to the memory port, a second buffer of which the output is connected to a first input of the data selector, and the input is connected to the first network port, a third buffer of which the output is connected to a second input of the data selector, and the input is connected to the memory port, a first packet interpreter for detecting the packet length included in the data input from the first network port, first and second address controllers for setting the network switch addresses according to the output from the first packet interpreter, a first address selector of which the input is the output from the first and second address controllers, and the output is connected to the first network port, a first control means for controlling the data transfer operation of the first network port, a second packet interpreter for detecting the packet length included in the data input from the third buffer to determine the packet length, a third address controller for setting the network switch addresses according to the output from the second packet interpreter, a third packet interpreter for detecting the packet length included in the data input from the second buffer to determine the packet length, a fourth address controller for setting the network switch addresses according to the output from the third packet interpreter, a second address selector of which the input is the output from the third and fourth address controllers, and the output is connected to the second network port, and a second control means for controlling the data transfer operation of the second network port.

7. A parallel processing system comprising an $N \times N$ matrix of processor elements arranged in a two-dimensional array with a data packet transfer apparatus comprising a memory port connected to an external memory area, first and second network ports connected to switches of network, a data selector of which the output is connected to the second network port, a first buffer of which the input is connected to the first network port, and the output is connected to the memory port, a second buffer of which the output is connected to a first input of the data selector, and the input is connected to the first network port, a third buffer of which the output is connected to a second input of the data selector, and the input is connected to the memory port, a first packet interpreter for detecting the packet length included in the data input from the first network port, first and second address controllers for setting network switch addresses according to the output from the first packet interpreter, a first address selector of which the input is the output from the first and second address controllers, and the output is connected to the first network port, a first control means for controlling the data transfer operation of the first network port, a second packet interpreter for detecting the packet length included in the data input from the third buffer to determine the packet length, a third address controller for setting the network switch addresses according to the output from the second packet interpreter, a third packet interpreter for detecting the packet length included in the data input from the second buffer to determine the packet length, a fourth address controller for setting the network switch addresses according to the output from the third packet interpreter, a second address selector of which the input is the output from the third and fourth address controllers, and the output is connected to the second network port, and a second control means for controlling the data transfer operation of the second network port functioning as the interface to the network, and an $N \times N \times N$ matrix of switches in a three-dimensional arrangement with each switch comprising two internal buffers;

when in this network the processor element in row i column j is identified as PEij and the number-k switch at row i column j is identified as SWijk where i, j, k, and l are integers greater than zero and less than or equal to (N−1), one network port of PEij is connected in common to one terminal of N switches SWijk (k=0, 1, . . . N−1), the other network port of PEij is connected in common to one terminal of N switches SWjli (1=0, 1, . . . N−1), the other terminal of SWijk is connected to PEki, and the other terminal of SWjli is connected to PEjl, and when plural packets comprising a header and plural data blocks are transferred from PEij to PElk, the packets are transferred from PEij through the first buffer of SWijk to PEki in the first transfer step, and from PEki through the second buffer of SWkil to PElk in the second transfer step, and data transfer apparatus PEki specifies using the first address controller the addresses of those N switches SWijk (j=0, 1, . . . N−1) of which the first buffer is in use, specifies using the second address controller the addresses of those N switches SWijk (j=0, 1, . . . N−1) of which the second buffer is in use, specifies using the third address controller the addresses of those N switches SWkil (1=0, 1, . . . N−1) of which the first buffer is in use, specifies using the fourth address controller the addresses of those N switches SWkil (1=0, 1, . . . N−1) of which the second buffer is in use, uses the third address controller when sending data in the first transfer step, and uses the first address controller when receiving data in the first transfer step, uses the fourth address controller when sending data in the second transfer step, and uses the second address controller when receiving data in the second transfer step, and when the first and second transfers are mixed, switches between the first and second address controllers when receiving, and switches between the third and fourth address controllers when sending, and the address controllers are characterized by changing the address only at the breaks between packets during the data transfer operation.

8. A parallel processing system according to claim 7 wherein the packets used comprise a field indicating the transfer mode, a field indicating the switch address in the network, a field indicating a broadcast, which signifies transfer to all switches, and a field indicating the packet length.

* * * * *

UNITED STATES PATENT AND TRADEMARK OFFICE
CERTIFICATE OF CORRECTION

PATENT NO. : 5,408,613
DATED : April 18, 1995
INVENTOR(S) : Ichiro Okabayashi

It is certified that error appears in the above-indentified patent and that said Letters Patent is hereby corrected as shown below:

Column 18, Line 20: "packets used" should read --packets--.

Signed and Sealed this

Twenty-sixth Day of December, 1995

Attest:

BRUCE LEHMAN

Attesting Officer     Commissioner of Patents and Trademarks